Dec. 5, 1944.   M. F. MORGAN   2,364,586
SINTERING MACHINE
Filed Feb. 13, 1942   2 Sheets-Sheet 1
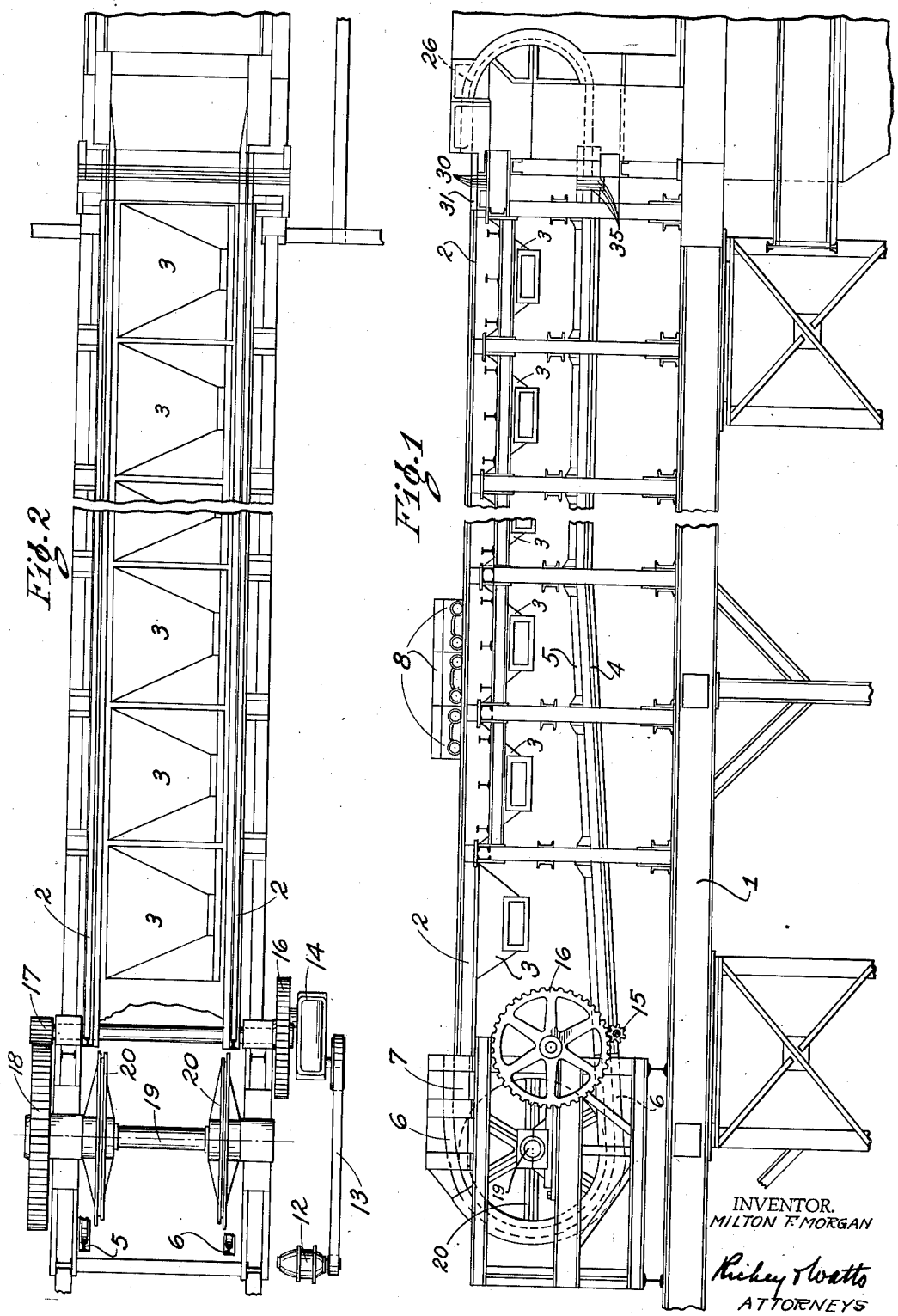
INVENTOR.
MILTON F. MORGAN
ATTORNEYS Dec. 5, 1944.  M. F. MORGAN  2,364,586
SINTERING MACHINE
Filed Feb. 13, 1942  2 Sheets-Sheet 2
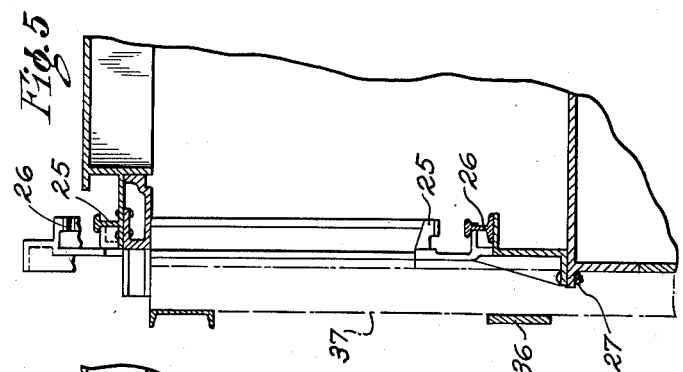
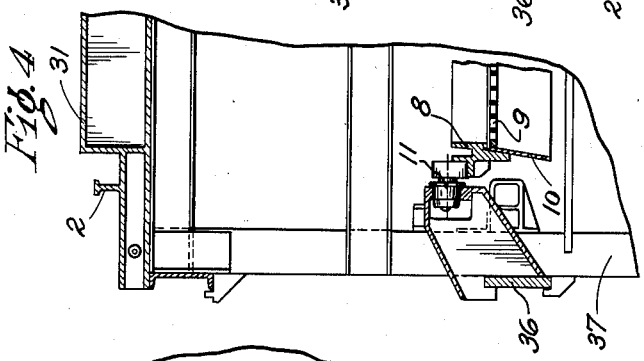
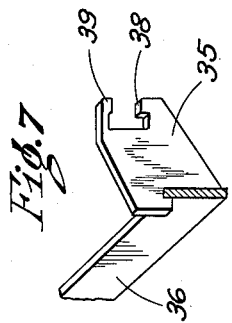
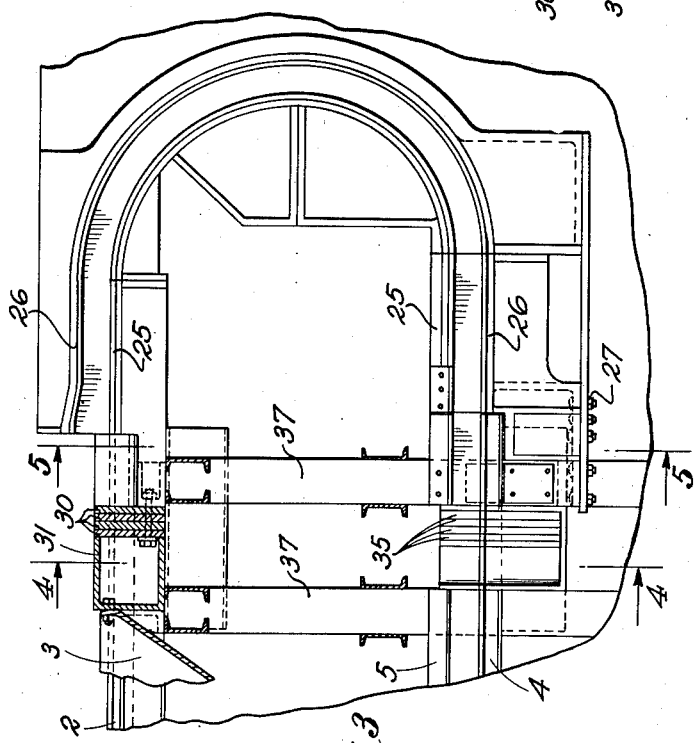
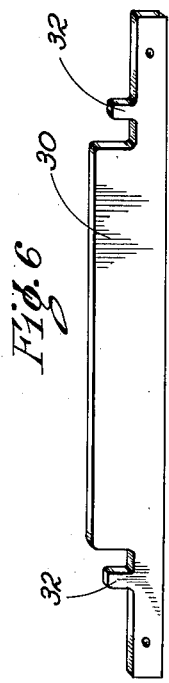
INVENTOR.
MILTON F. MORGAN
BY Richey & Watts
ATTORNEYS Patented Dec. 5, 1944

2,364,586

UNITED STATES PATENT OFFICE 2,364,586

SINTERING MACHINE

Milton F. Morgan, Shaker Heights, Ohio, assignor to Republic Steel Corporation, Cleveland, Ohio, a corporation of New Jersey Application February 13, 1942, Serial No. 430,710

5 Claims. (Cl. 266—21)

This invention relates generally to the sintering art, and particularly to a new and improved sintering machine in which the spacing between pallets may be maintained within a predetermined range.

Sintering machines, of the type to which the present invention especially pertains, have been constructed with upper and lower tracks or runs connected by curved end tracks or runs to form an endless path of fixed length for pallets. The pallets are equipped with wheels to roll on said tracks or runs. Such machines have wheels at one, the loading, end of the machine which engage with an move the pallets, one at a time, from the lower run to the upper run. As each pallet is propelled onto the upper run it comes into end-to-end contact with a preceding pallet and exerts a pushing force thereon which is transmitted to all the preceding pallets on the upper run. When the leading pallet of such a string of pallets reaches the curved end run at the other, or discharge, end of the machine, such leading pallet runs freely and at a higher rate of speed down along the curved tracks toward the lower run and bumps into the preceding pallet on that run, thereby propelling the latter pallet and preceding pallets on the lower run toward the loading end of the machine. It is necessary to maintain a short predetermined distance between pallets to allow for expansion at the discharge end of the machine. The impact force delivered by one pallet to a preceding pallet at that end depends on the distance a pallet can run before striking a preceding pallet and if the force is sufficiently large cracking or breakage of the pallets may result.

Since the pallets are in end-to-end contact thruout most of their travel, the end surfaces of each pallet are subjected to wear. Continued use of the pallets, with resultant continued wear of the end surfaces thereof, decreases the length of each pallet. In a short time this wear may easily amount, in the aggregate, to a distance equivalent to the length of a single pallet. As the pallets become shorter, the distance a pallet may travel on the discharge end run before it strikes a preceding pallet increases because the pallets on the lower run tend to maintain end-to-end contact thruout the string on that run from the loading end back toward the discharge end due, in part, to the downward inclination of part of that run.

Various efforts have been made to avoid breakage of the pallets traceable to such end surface wear, but so far as I know none of such efforts and none of the expedients proposed has been entirely satisfactory. By the present invention I am able to overcome the prior disadvantages without interfering with the operation of the machine or adding materially to its cost.

Briefly stated, my invention consists in providing a sintering machine which is adjustably expansible and contractible to compensate for end wear on the pallets. One embodiment of the invention includes a discharge end run which is movable toward and away from the ends of the fixed upper and lower runs, and filler members for the space left when that end run is moved away from the ends of the fixed runs. In this manner the free running distance of the pallets at the discharge end is kept within such limits that cracking and breakage of pallets is held at a minimum amount.

The present invention will be better understood by reference to the accompanying drawings, in which one embodiment of the present invention is disclosed and in which Figure 1 is a side elevation of a sintering machine embodying the present invention, certain parts being broken away;

Figure 2 is a top plan view of the apparatus of Fig. 1;

Figure 3 is an enlarged side elevational view of the discharge end of the machine of Fig. 1 with filler pieces in place;

Figure 4 is a fragmentary sectional view taken on line 4—4 of Fig. 3;

Figure 5 is a fragmentary sectional view taken on line 5—5 of Fig. 3;

Figure 6 is a perspective view of a filler piece for the upper run; and,

Figure 7 is a perspective view of a filler piece for the lower run.

In Figs. 1 and 2 is shown a sintering machine supported on a framework indicated as an entirety by numeral 1. This machine comprises an upper run including a pair of tracks or rails 2 which are substantially horizontal and wind boxes 3. The lower run includes a pair of tracks or rails 4 and top guards 5. A part of this lower run is inclined downwardly toward the charging end of the machine. The upper and lower runs 2 and 4 are connected by a curved end run at the charging end of the machine. This curved run includes rails 6 which are aligned with rails 4 and guards 7 which are aligned with guards 5 of the lower run and with rails 2 of the upper run.

The pallets of the machine are shown in Figs. 2 and 4. Each pallet consists of a frame 8, including a grate 9 and walls 10 to retain material on the grate. Each pallet is provided with wheels 11, two on each side, to run on rails 2 and 4 and be retained thereon by guards 6 and 7. Rails 6 also act as guards for wheels 11 of the pallets when a pallet is being moved from the lower run to the upper run along the curved end 1 at the charging end of the machine.

Pallets are moved from the lower run to the upper run by the mechanism shown in Figs. 1 and 2. This mechanism includes a motor 12, belt 13, speed reducing mechanism 14, pinion 15, gear 16, pinion 17 and gear 18 keyed to shaft 19 which carries pallet propelling wheels 20. These wheels 20 have peripheral projections, preferably detachable lugs (not shown) which engage in correspondingly shaped sockets on the pallets and when the wheels 20 are rotated the pallets so engaged are propelled from the lower run to the upper run. As each pallet reaches the upper run, material to be sintered is discharged thereinto to a spout or other suitable means (not shown). The pallet then moves under a lighted burner (not shown) which ignites the combustible material in the charge with the aid of a draft induced down thru the wind boxes 3 by suction means (not shown).

The apparatus just described, including the upper and lower runs and the curved charging end run, are more or less conventional.

At the discharge end of the machine a curved end run is provided to connect the upper and lower runs, as shown in Figs. 1 and 2 and in enlarged detail in Fig. 3. This discharge end run comprises a pair of rails or tracks 25 which are aligned with rails 2 of the upper run and with guard 5 of the lower run; and also with guards 26 which, at their lower ends, are aligned with rails 4. When a pallet is propelled onto the discharge end run, the wheels 11 of the pallet roll on rails 25 for part of the length of those rails and on guards 26 for part of their length.

The curved end run, consisting of the tracks 25 and guards 26, and supporting mechanism, is adjustably moved on frame 1 toward and away from the ends of the fixed tracks 2 and 4, and may be maintained in any position to which it is adjusted by any suitable means, for example by bolts 27 (Fig. 3).

When the discharge end run is moved away from the ends of tracks 2 and 4 the resulting space between the ends of those tracks and tracks 25 and guards 26 is filled by filler pieces which constitute continuations of rails 2 and 4 and guards 5.

In Fig. 6 is shown one of the filler pieces 30 for the upper run. This filler piece is preferably composed of a metal plate which may be bolted at its ends to the end piece 31 of the upper run, as shown in Figs. 3 and 4, and has upstanding portions 32 which are aligned with tracks 2 and 25 and serve as continuations thereof. Any number of filler pieces 30 may be used, depending of course on the amount of space which is to be filled between the end of the upper run and the discharge end run.

Filler pieces are also provided for the lower run. These filler pieces 35, as shown in Fig. 7, are preferably flat metal plates of substantially the same thickness as fillers 30. They are notched so as to be hung on a side plate 36 carried by uprights 37 of the machine and each one is cut away on one edge to provide an upstanding projection 38 which is aligned with a rail 4 of the lower run and on which wheels 11 of the pallets may roll in passing from tracks 26 of the end run to tracks 4 of the lower run. Extending downwardly and opposed to projection 38 is a guard 39 which is aligned with guards 5 and 25. It will be understood that for each filler piece 30 used on the upper run two filler pieces 35 are required for the lower run. It will also be understood that the total overall length of the runs of the machine may be lengthened by inserting filler pieces 30 and 35, and may be shortened by removing such filler pieces.

The manner of use of the present invention as embodied in the above described apparatus is substantially as follows: When the machine is equipped with new pallets the discharge end run may abut against the adjacent ends of tracks 2 and 4 and guards 5, i. e., without any filler pieces being interposed therebetween, and the number of pallets on the run is such that when the leading pallet of a string of pallets on the top run is moved far enough onto the discharge end run to move forwardly and downwardly by the action of gravity, it will run freely for only a limited distance, for example, between about seven inches and nine inches before it comes into end-to-end contact with a preceding pallet. The force of the impact which results from this amount of free running of the pallet and contact with the preceding pallet is sufficient to dislodge the sintered material from the pallet, but is insufficient to crack or break either of the pallets. As the end surfaces of the pallet wear away during continued use of the machine, the distance thru which a pallet may run freely down along the discharge end run increases. According to the present invention, when the distance thru which a pallet may run freely before engaging the preceding pallet reaches a certain amount, for example about 21 inches, the discharge end run is moved away from the remainder of the machine and a sufficient number of filler pieces are inserted in the resulting spaces to lengthen the total run of the machine enough to permit the addition of another pallet. It will be understood that the space required for this additional pallet is made up partly by the widths of the filler pieces inserted and partly by the wear on the end surfaces of the pallets. When a new pallet is added the distance thru which a pallet may run freely on the discharge end run is reduced to a minimum amount, for example, nine inches. Thereafter, as wear occurs and the free moving space of pallets at the discharge end approaches the maximum preferred amount, additional filler pieces may be added and another pallet also added. When pallets have been added to the limit of expansion of the machine all the filler pieces may be removed, the discharge end run brought into contact with the upper and lower runs, and one or more pallets removed from the machine to reduce the free running distance of the pallets at the discharge end run to within the desired limits.

Having thus described my invention so that those skilled in the art may be able to understand and practice the same, I state that what I desire to secure by Letters Patent is defined in what is claimed.

What is claimed is:

1. In a sintering machine having fixed upper and lower runs, a curved end run connecting said upper and lower runs, and means for propelling pallets around said curved end run from the lower run to the upper run, means for preventing breakage of the pallets and compensating for wear on the ends of the pallets, said means comprising a curved discharge end run adjustably movable toward and away from the adjacent ends of said upper and lower run, and fillers in the space between the ends of the fixed upper and lower runs and the curved discharge end run.

2. In a sintering machine having fixed upper and lower runs, a curved end run connecting said upper and lower runs, and means for propelling pallets around said curved end run from said lower run to said upper run, means for preventing breakage of the pallets and compensating for wear on the ends of the pallets, said means comprising the combination of a curved discharge end run adjustably movable toward and away from the ends of said upper and lower runs, and a filler piece removably secured at the end of the rails of said upper run and having portions constituting a continuation of both rails of said run.

3. In a sintering machine having fixed upper and lower runs, a curved end run connecting said upper and lower runs, and means for propelling pallets around said curved end run from said lower run to said upper run, means for preventing breakage of the pallets and compensating for wear on the ends of the pallets, said means comprising the combination of a curved discharge end run adjustably movable toward and away from the ends of said upper and lower runs, and filler pieces movably positioned at the ends of the rails of said lower run and each constituting a continuation of one of the rails of said run.

4. In a sintering machine having fixed upper and lower runs, a curved end run connecting said upper and lower runs, and means for propelling pallets around said curved end run from said lower run to said upper run, means for preventing breakage of the pallets and compensating for wear on the ends of the pallets, said means comprising the combination of a curved discharge end run adjustably movable toward and away from the ends of said upper and lower runs, a filler piece removably secured at the end of the rails of said upper run and having portions constituting a continuation of both rails of said run, and filler pieces removably positioned at the ends of the rails of said lower run and constituting continuations of said rails.

5. In a sintering machine having fixed upper and lower runs, including rails, and means for propelling pallets along said upper run, means for preventing the breakage of pallets and compensating for wear on the ends of pallets, said means comprising a curved discharge end run, including rails, for conducting pallets from the upper run to the lower run, said end run being supported for movement toward and away from the adjacent ends of said upper and lower runs while the top surfaces of the end portions of its rails are maintained in substantially the planes of the upper surfaces of the adjacent ends of the rails of the upper and lower runs, and removable means between said opposed end surfaces of said rails when they are spaced apart, said means serving as extensions of the rails to facilitate movement of pallets from the upper run to the end run and from the end run to the lower run.

MILTON F. MORGAN.